United States Patent [19]

Imazeki et al.

[11] Patent Number: 4,891,633
[45] Date of Patent: Jan. 2, 1990

[54] DIGITAL IMAGE EXCHANGE SYSTEM

[75] Inventors: Kazuyoshi Imazeki; Yasuo Nagazumi, both of Tokyo, Japan

[73] Assignee: General Research of Electronics, Inc., Tokyo, Japan

[21] Appl. No.: 633,587

[22] Filed: Jul. 23, 1984

[51] Int. Cl.$^4$ ............................................... H04K 1/00
[52] U.S. Cl. ........................................ 340/717; 380/5; 380/18; 380/34; 380/50; 358/86; 358/425; 370/124
[58] Field of Search ............... 358/86, 259, 85, 102, 358/903; 340/825.52, 706, 717; 364/900, 200; 380/34, 3-5, 249-250, 18; 370/69.1, 85, 88, 124; 379/53, 54, 110

[56] References Cited

U.S. PATENT DOCUMENTS

| | | | |
|---|---|---|---|
| 4,032,972 | 6/1977 | Saylor | 358/86 |
| 4,091,423 | 5/1978 | Branscome | 358/258 |
| 4,247,106 | 1/1981 | Jeffers et al. | 358/86 X |
| 4,264,924 | 4/1981 | Freeman | 358/86 |
| 4,264,925 | 4/1981 | Freeman et al. | 358/86 |
| 4,450,477 | 5/1984 | Lovett | 358/86 |
| 4,455,570 | 6/1984 | Saeki et al. | 358/86 |
| 4,518,989 | 5/1985 | Yabiki et al. | 358/86 |
| 4,530,008 | 7/1985 | McVoy | 380/34 |
| 4,536,791 | 8/1985 | Campbell et al. | 358/258 |
| 4,538,174 | 8/1985 | Gargini et al. | 358/86 |
| 4,549,219 | 10/1985 | Sue et al. | 358/257 |
| 4,560,833 | 12/1985 | Weber et al. | 379/53 |
| 4,574,284 | 3/1986 | Feldman et al. | 340/825.52 |
| 4,639,890 | 1/1987 | Heilveil et al. | 364/900 |
| 4,734,765 | 3/1988 | Okada et al. | 358/102 |

FOREIGN PATENT DOCUMENTS 0091327  10/1983  European Pat. Off. .............. 379/53

Primary Examiner—Stphen C. Buczinski
Assistant Examiner—Bernarr Earl Gregory
Attorney, Agent, or Firm—R. A. Backstone, Jr.

[57] ABSTRACT

A digital image exchange system comprises a data transmission line, at least one video RAM, at least one video signal generator for accessing data from the video RAM and for developing at least two video signals corresponding respectively to the accessed data, and at least one modulator for modulating the video signals to form transmitted signals in at least two different frequency bands to be transmitted on the data transmission line. At least one demodulator is coupled to the transmission line at a location remote from the modulator for demodulating the transmitted signals in each of the at least two frequency bands to form at least two corresponding video signals; and at least one video display device is operatively coupled with the demodulator for displaying visual images corresponding to the respective video signals.

21 Claims, 4 Drawing Sheets

DIGITAL IMAGE EXCHANGE SYSTEM

BACKGROUND OF THE INVENTION

The invention relates generally to visual image display systems and more particularly to a high speed digital image exchange system which supports a plurality of display devices for one or more computers, video terminals or graphic work stations.

The transmission of visual images or visual pattern data often requires considerable time because of the limited data-transmission speed normally possible over a conventional transmission line. For example, a typical video random access memory (VRAM) capable of storing one frame of video information comprising 512 ×512 piccels having 4096 colors, must leave a storage capacity of about 3Mbits/frame. Transmitting 3Mbits (i.e., $3 \times 10^6$ bits) of information would require about 5.5 minutes over a RS232C serial line which has 9600 bands transmission capacity, for example. Such a long transmission time is too long for an interactive operation system of a computer.

It is possible to improve transmission time by connecting each video terminal to a remote processor. However, this necessitates very complicated wiring and requires that strict limitations on cable lengths be observed, because of signal attenuation characteristics of cable. Furthermore, signal source selection is also greatly restricted, because of the need for physical cable switching or reconnection to accommodate selection from among multiple sources.

OBJECTS AND SUMMARY OF THE INVENTION

It is therefore an object of the present invention to provide a digital image exchange system with increased data transmission speed on a simple transmission line, for example, a broad band coaxial cable.

It is a further object to provide a digital image exchanger system with improved access to multiple source areas in a video RAM device.

It is a further object to provide a digital image exchange system which can operate on the same transmission line used by a local-area network (LAN) system, in frequency-separated channels.

It is a further object to provide a digital image exchange system with improved security features for limiting access to information in the system to authorized persons.

A digital image exchange system comprises a data transmission line; video RAM means; video signal generator means for accessing data from said video RAM means and for developing at least two video signals corresponding respectively to the accessed data; and modulator means for modulating said video signals to form transmitted signals in at least two different frequency bands to be transmitted on said data transmission line. Demodulator means are coupled to said transmission line at a location remote from said modulator means for demodulating said transmitted signals in each of said at least two frequency bands to form at least two corresponding video signals; and at least one video display device is operatively coupled with said demodulator means for displaying visual images corresponding to the respective video signals.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawing which like reference numerals identify like elements, and in which:

DETAILED DESCRIPTION OF THE ILLUSTRATED EMBODIMENT

Figure 1:
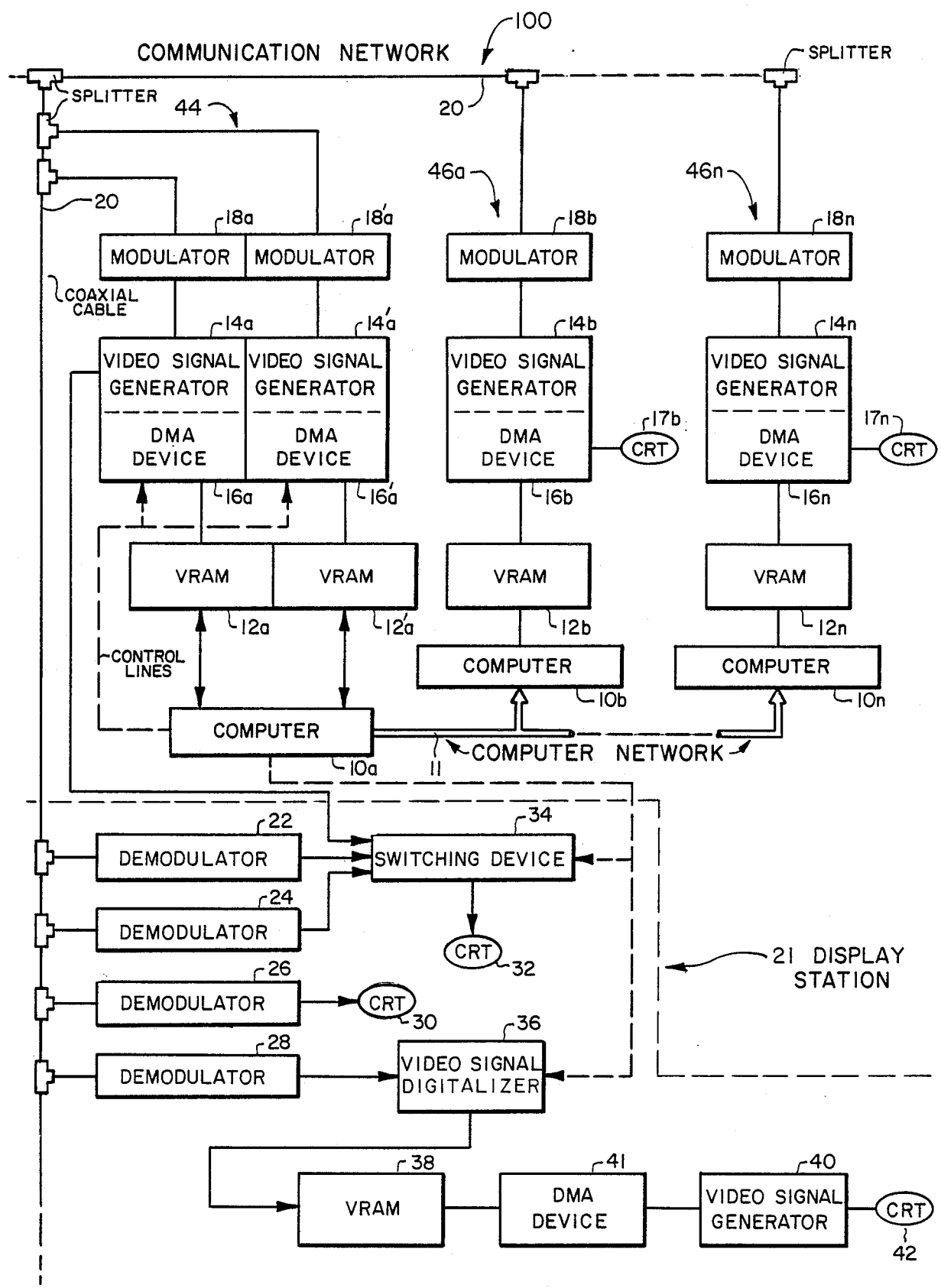
FIG. 1 is a block diagram of a first embodiment of digital image exchange system in accordance with the invention.

Referring to FIG. 1, there is illustrated a block diagram of a digital image exchange system or communications network 100 in accordance with the present invention in conjunction with a system comprising a plurality of similar small computers 10a, 10b . . . 10n which are coupled to a network bus 11 to operate as a computer network. A plurality of video random access memories (VRAM's) 12a, 12'a and 12b . . . 12n are coupled to computers 10a and 10b . . . 10n, respectively.

A corresponding plurality of video signal generators 14a, 14'a and 14b . . . 14n respectively access these VRAM's by way of corresponding direct memory access devices (DMA's) 16a, 16'a and 16b . . . 16n and provide video signals to corresponding modulators 18a, 18'a and 18b . . . 18n, respectively. Each modulator operates to modulate the video signals to a predetermined frequency range or band or "channel". These modulated signals are then combined to form transmitted signals on a data transmission line such as a coaxial cable or trunk 20. The computers 10b . . . 10n may also be provided with video displays such as cathode ray tubes (CRT's) 17b . . . 17n to display video information from the corresponding VRAM's 12b . . . 12n by way of the DMA's 16b . . . 16n.

The operation of each of the video signal generators 14a, 14b . . . 14n may be under control of the associated one of computers 10a, 10b . . . 10n. Similarly, the contents of each of the VRAM's are controlled by the associated one of the computers.

A display station or portion 21 may be at a location remote from the computer network and includes a plurality of demodulators 22, 24, 26 and 28. These demodulators receive the modulated and transmitted signals in the predetermined frequency bands from the coaxial cable 20 and convert these signals back into corresponding video signals. In the example illustrated in FIG. 1, demodulator 26 is connected directly to a video display such as a cathode ray tube (CRT) 30 to display the transmitted and demodulated image. The output signals from demodulators 22 and 24 are fed to a second CRT 32 through a switching device 34 which, under the control of the computer 10a, selects either the signal from one of the demodulators 22, 24 or the signal from the video signal generator 14a and displays the corresponding video image.

The output signal from demodulator 28 is fed to a video signal digitalizer 36 which converts the video signal into digital codes and stores them in another, local VRAM 38. An additional video signal generator 40 accesses this local VRAM 38 independently by way of a DMA 41 and generates video signals to display on a further associated CRT 42. The video signal digitalizer 36 is also controlled by the computer 10a.

Advantageously, when using the system described above, the capacity of single transmission line such as cable or channel 20 is utilized more efficiently because the cable or channel is no longer dedicated to a single modulator and a single demodulator. The system described above is particularly useful for monitoring and controlling a plurality of computers with a single, relatively small computer of relatively low data communication capacity and performance. This is possible because the whole system can be monitored from a controlling unit such as the computer 10a. For example, any system defect or unauthorized operation of the various elements of the system may be visually monitored.

In the foregoing example, the switching device 34 may be replaced by a video signal mixing device. This latter alternative allows cumulative video images to be generated by combining the output signals from two or more of the VRAM's.

It will be understood that computer 10a and associated components in the foregoing example form as a host or controlling computer system 44 with respect to the display station or portion 21 and the remaining computers 10b . . . 10n. In this regard, computers 10b . . . 10n and the respective related components may be remotely located with respect to host computer system 44, to form work stations or remote terminals 46a . . . 46n.

Figure 2:
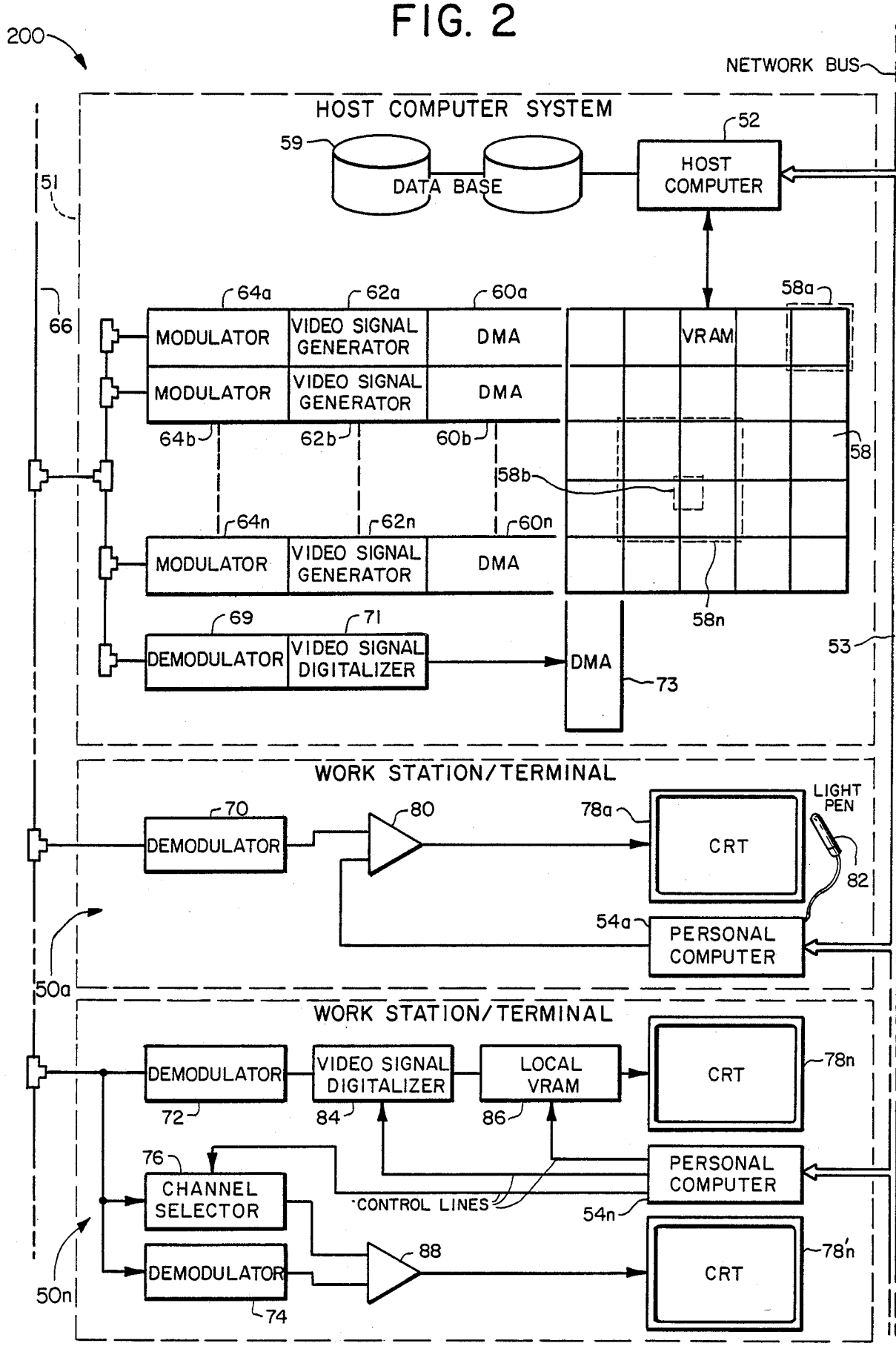
FIG. 2 is a block diagram of a second embodiment of a digital image exchange system, similar to FIG. 1 and adapted for use in a computer assisted design system.

Referring to FIG. 2, there is illustrated a block diagram of a digital image exchange system or communications network 200 in accordance with the present invention embodied as a computer assisted design (CAD) system. This system 200 contains a plurality of graphic work stations 50a . . . 50n connected to a host computer system 51 by use of a local-area communicator network (LAN), here represented by a network bus 53. In this regard, personal computers or terminals 54a . . . 54n are connected by the bus 53 to a host computer 52, which is provided with a relatively large capacity VRAM 58, and also accesses a data base 59. The terminals 50a . . . 50n may independently access the host computer 52 to order jobs or the like.

The host computer 52 can directly access VRAM 58 so that the contents of VRAM 58 are controlled by this host computer 52. The VRAM 58 is also connected to a plurality of direct memory access (DMA) devices 60a, 60b . . . 60n, each of which can independently access a preselected, corresponding portion or area 58a, 58b . . . 58n of the VRAM, this pre-selection being accomplished by the host computer 52.

The DMA devices 60a . . . 60n transmit digital data to respective corresponding video signal generators 62a, 62b . . . 62n, which in turn have their output signals modulated to a corresponding one of a plurality of channels or frequency ranges or bands by corresponding modulators 64a, 64b . . . 64n. This substantially avoids cross-talk or interference between video signal generators. The modulators transmit the modulated signals over a common transmission line 66, to form a combined transmitted signal.

Demodulators 69, 70, 72, 74 and a channel selector 76 demodulate corresponding frequency bands or channels from the combined signals carried on the transmission line 66 and convert them back into the corresponding video signals. At host computer system 51, demodulator 69 feeds signals from a selected channel to be redigitalized by a video signal digitalizer 71. This digitalized signal may then be stored in a preselected location in VRAM 58 by a DMA 73.

At terminal or work station 50a, the demodulated output signals from demodulator 70 are combined at a summing amplifier 80 with the output video signal of personal computer 54a for display on a CRT 78a. In the illustrated embodiment the video signal output of personal computer 54a corresponds to the movement of a light pen 52.

At terminal or work station 50n, the demodulated output signals of the demodulator 72 are redigitalized by a video signal digitalizer 84 and stored in a local VRAM 86, so that local modification of the image data becomes possible. This data from VRAM 86 may be displayed on an associated CRT 78n. Channel selector 76 and demodulator 74 demodulate further specific channels or frequency bands from the combined signals on the transmission line 66. These demodulated signals are combined at a summing amplifier 88 into a composite video signal for display on an associated CRT 78'n.

The system illustrated in FIG. 2 provides surprisingly flexible and convenient computer graphic work stations. For example, the described structure of work station 50a allows real time inter-active operation of the host computer 52. Furthermore, the described host computer system 51, under control of computer 52, permits rapid selection of data from among the many portions or areas of the VRAM 58. As a further example, the described structure of work station 50n provides the functions of local modification of video image and image overlay of multiple video image data, which results in improved quality of the image displayed. The two CRT's 78n and 78'n also provide simultaneous multiple displays, which is particularly advantageous in a CAD system, allowing the operator to view multiple images and/or data simultaneously.

Figure 3:
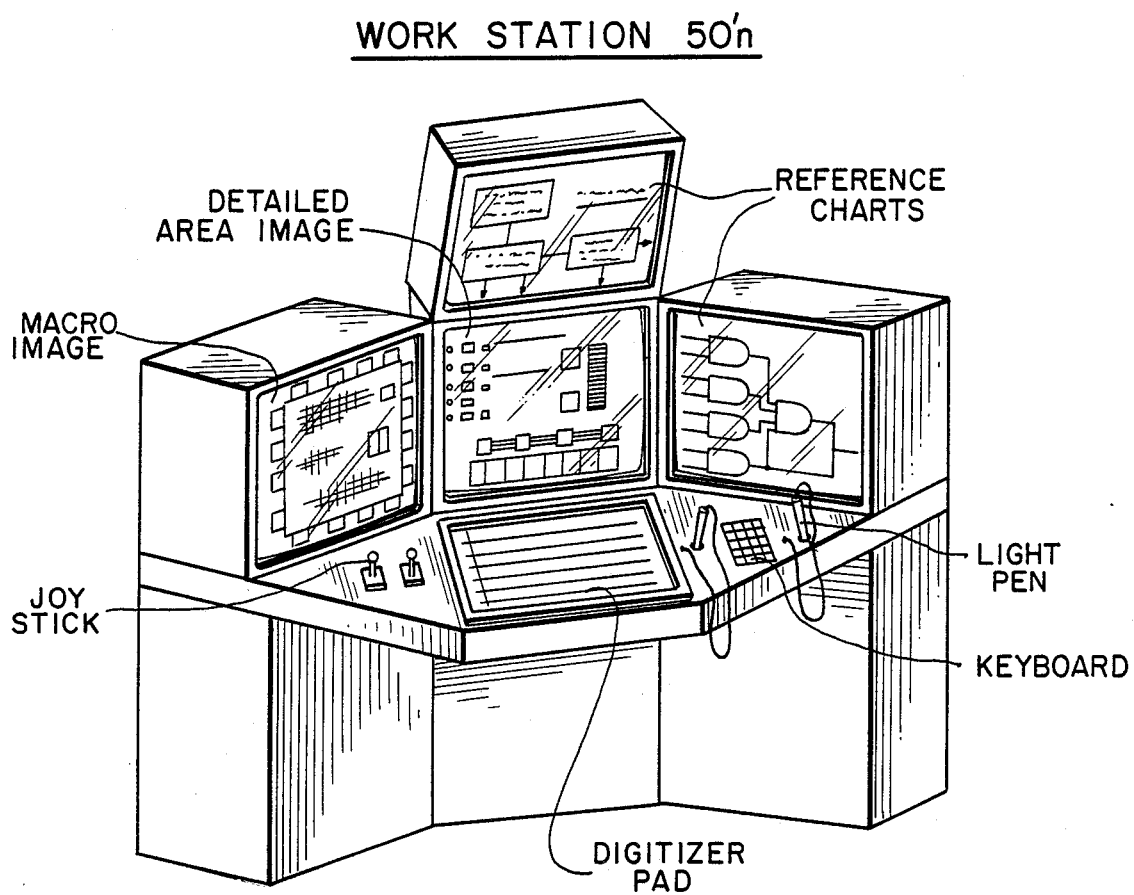
FIG. 3 is a diagrammatic view of an operator terminal which may be used in conjunction with the system of FIG. 2.

FIG. 3 illustrates an exemplary work station 50'n employing structure similar to that described with reference to work station 50n of FIG. 2. Using such features an operator can simultaneously make available many images such as charts or the like related to a specific job, greatly improving operator efficiency. The illustrated system is particularly useful fro CAD-like integrated circuit development and image processing for remotely generated geographical or location data related to integrated circuit layout.

Figure 4:
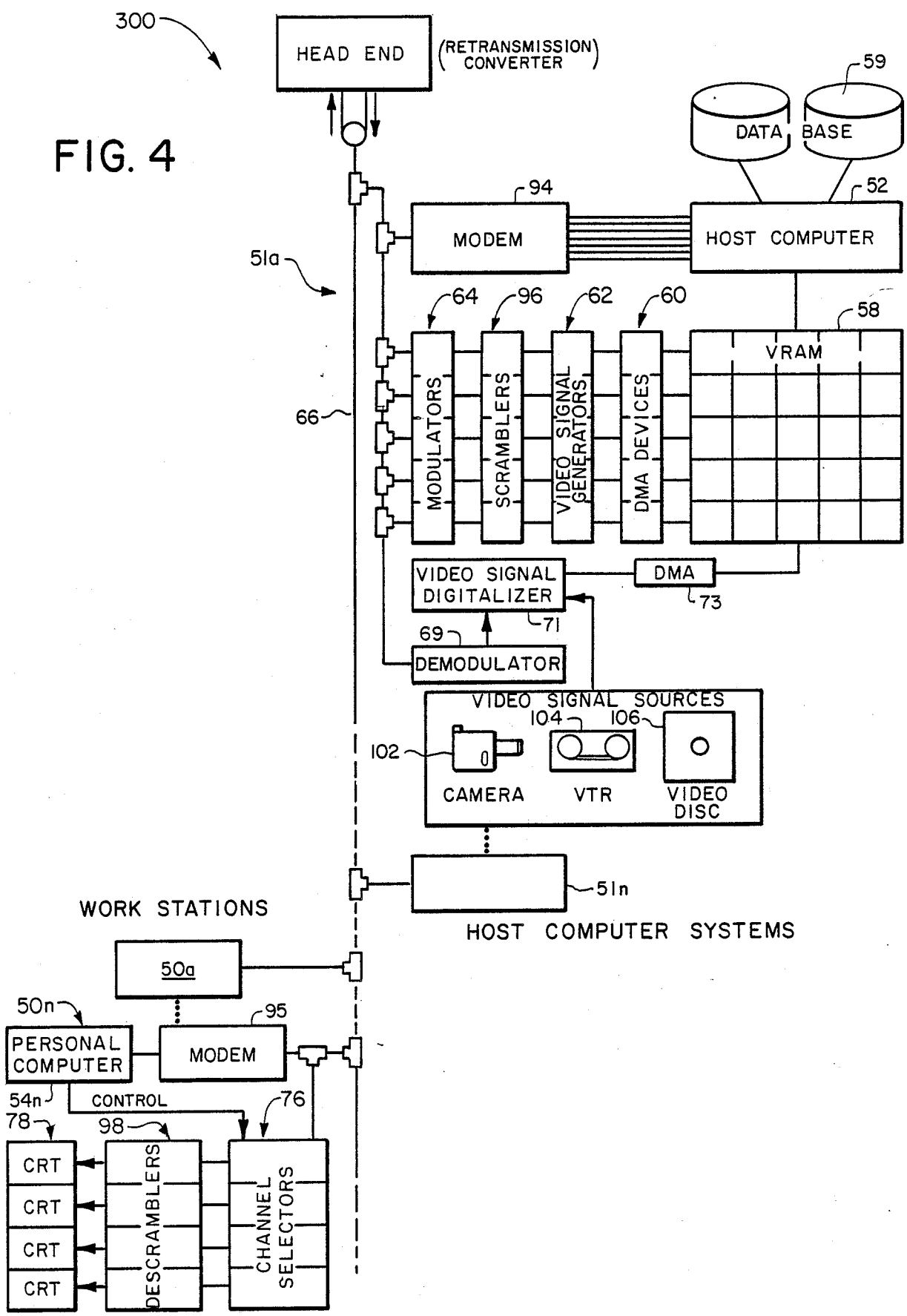
FIG. 4 is a block diagram of a further embodiment of a digital image exchange system similar to the system of FIG. 2.

A network 300 shown in FIG. 4 is similar to network 200 of FIG. 2 and like reference numerals designate like components. In FIG. 4, the medium for digital image transmission is a coaxial cable 94, preferably of the type used for broadband LAN systems, and for transmission in a frequency band separated from the band used for image data. Signal scramblers 96 are provide for encoding the image signals in the transmitter (i.e., host computer system) side of the transmission line 66. Accordingly, complementary descramblers 98 are provided at the work stations 50a . . . 50n in order to recover the image signals on the receiver (i.e., work station) side. Modems 94, 95 are respectively provided for host computer 52 and each work station computer 54a...54n to interface with the transmission line 66. In the embodiment of FIG. 4, a plurality of similar host computer systems 51a...51n may be provided. Also additional video signal sources such as a camera 102, a video tape recorder (VTR) 104 and a video disc player 106 may be provided. These additional video signal sources all feed into a selected host system 51a...51n by way of video signal digitalizer 71.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A digital image exchange system comprising: a single bidirectional data transmission line for exchanging digital images; video RAM means; video signal generator means for accessing data from said video RAM means and for developing at least two video signals corresponding respectively to the accessed data; a plurality of modulator means for modulating said video signals to form transmitted signals in at least two different frequency bands to be transmitted on said data transmission line; a plurality of demodulator means coupled to said transmission line at a location remote from said modulator means for demodulating said transmitted signals in each of said at least two frequency bands to form at least two corresponding video signals; and at least one video display device operatively coupled with said each of said demodulator means for displaying visual images corresponding to the respective video signals.

2. The system of claim 1, and further comprising at least one additional source of video signals, and combining means coupled to said demodulator means and to said at least one additional source for combining a first one of said at least two video signals with one of a second one of said at least two video signals and a video signal from said additional source of video signals.

3. The system of claim 1, and further comprising scrambling means coupled with said video signal generator means for encoding said video signals generated by said video signal generator means to form encoded signals; and descrambling means coupled with said demodulator means for decoding said encoded signals.

4. The system of claim 1 and further comprising video signal digitalizer means connected between said demodulator means and said video display device for converting video signals into digital data.

5. The system of claim 1, wherein said data transmission line comprises a transmission medium of a local-area network communication system.

6. The system of claim 1 wherein said video RAM means comprises a plurality of video RAM's and wherein said video signal generator means comprises a plurality of video signal generators for separately accessing data from respective ones of said plurality of video RAM's.

7. A system according to claim 6 wherein said plurality of video RAM's are remotely located with respect to said video display device; and further including at least one local video RAM operatively coupled with said demodulator means and with said at least one video display device.

8. A system according to claim 1 wherein said video RAM means comprises a single video RAM and wherein said video signal generator means comprises a plurality of video signal generators for separately accessing data from a plurality of different, preselected portions of said video RAM.

9. A system according to claim 8 and further including at least one local video RAM operatively coupled with said demodulator and with said at least one video display device.

10. A digital image exchange system comprising: a host computer system; a plurality of work stations located remotely from said host computer system; and a single data transmission line means bidirectional coupling said host computer system with said plurality of work stations; said host computer system including video RAM means, video signal generator means for accessing data from said video RAM means and for developing at least two video signals corresponding respectively to the accessed data, and a plurality of modulator means for modulating said video signals to form transmitted signals in at least two different frequency bands to be transmitted on said data transmission line; each of said work stations comprising demodulator means coupled to said transmission line for demodulating said signals in each of said at least two frequency bands to form at least two corresponding video signals, and video display means operatively coupled with said demodulator means for displaying visual images corresponding to the respective demodulated video signals.

11. The system of claim 10 wherein said video RAM means comprises a single video RAM and wherein said video signal generator means comprises a plurality of video signal generators for separately accessing data from different, preselected portions of said video RAM means.

12. A system according to claim 10 wherein said host computer system includes a host computer and wherein each of said work stations includes a work station computer, and further including network bus means for coupling said host computer with said work station computers to form a computer network.

13. A system according to claim 12 wherein each of said work station computers is responsive to said host computer for controlling transmission of demodulated video images from its associated demodulator means to its associated video display means.

14. A system according to claim 13 wherein said host computer system includes a host computer and wherein each of said work stations includes a work station computer and further including network bus means coupled intermediate said host computer and said work station computers to form a computer network.

15. A system according to claim 14 wherein said demodulator means comprises a plurality of demodulators, and wherein said video display means comprises a plurality of video display devices respectively operatively coupled with selected ones of said plurality of demodulators, and further including control means responsive to said host computer for controlling transmission of demodulated video signals between selected ones of said demodulators and the associated video display devices.

16. A system according to claim 12 wherein said network bus means and said data transmission line means comprise the transmission medium of a local-area network communication system.

17. The system according to claim 16 and further comprising a plurality of similar host computer systems coupled with said network bus means and with said data transmission line means.

18. A system according to claim 10 wherein at least one of said work stations further includes local video RAM means operatively coupled with said video display means and with said demodulator means.

19. A system according to claim 18 wherein said work station computer of said at least one work station is coupled to said local video RAM for selective local modification of the video image data.

20. A digital image exchange system comprising a host computer system; a plurality of work stations remote from said host computer system; at least one display station located remotely from said host computer system and from said plurality of work stations, and a single bidirectional data transmission line means for exchanging digital images; said host computer system and each of said work stations including video RAM means, video signal generating means for accessing data from said video RAM means and for developing video signals corresponding to the accessed data, and modulator means for modulating said video signals to form transmitted signals in a given frequency band to be transmitted on said data transmission line, each of said host computer and said plurality of work stations transmitting said transmitted signals in a different frequency band; said display station including a plurality of demodulator means coupled to said data transmission line means for demodulating the transmitted signals in each of said frequency bands to form corresponding video signals, and video display means operatively coupled with said demodulator means for displaying visual images corresponding to the respective demodulated video signals.

21. A system according to claim 20 wherein said display station further includes at least one local video RAM coupled with said demodulator means and with said video display means.

* * * * *